United States Patent [19]

Beckner et al.

[11] Patent Number: 5,220,332
[45] Date of Patent: Jun. 15, 1993

[54] RANGING BY SEQUENTIAL TONE TRANSMISSION

[75] Inventors: Frederick L. Beckner; Darrell K. Ingram, both of Palo Alto, Calif.

[73] Assignee: Cyberdynamics, Inc., Palo Alto, Calif.

[21] Appl. No.: 877,869

[22] Filed: May 4, 1992

[51] Int. Cl.$^5$ .............................. G01S 13/26
[52] U.S. Cl. .................... 342/125; 342/127
[58] Field of Search ............. 342/125, 50, 127

[56] References Cited

U.S. PATENT DOCUMENTS

| | | |
|---|---|---|
| H767 | 4/1990 | Kretschmer, Jr. et al. ......... 342/145 |
| H1044 | 4/1992 | Waters ........................ 342/125 X |
| 3,004,254 | 10/1961 | Steinberg et al. ................ 342/30 |
| 3,144,645 | 8/1964 | McIver et al. .................. 342/125 |
| 3,243,812 | 3/1966 | Williams ....................... 342/125 |
| 3,303,499 | 2/1967 | Mahoney et al. ................. 342/125 |
| 3,780,370 | 12/1973 | Reeves ......................... 342/46 |
| 3,868,692 | 2/1975 | Woodard et al. ................. 342/458 |
| 3,919,708 | 11/1975 | Pudsey ......................... 342/125 |
| 4,011,562 | 3/1977 | Bruce .......................... 342/46 |
| 4,136,394 | 1/1979 | Jones et al. ................... 364/561 |
| 4,170,773 | 10/1979 | Fitzsimmons .................... 342/42 |
| 4,278,977 | 7/1981 | Nossen ......................... 342/42 |
| 4,297,700 | 10/1981 | Nard et al. .................... 342/125 |
| 4,297,701 | 10/1981 | Henriques ...................... 342/42 |
| 4,357,609 | 11/1982 | Spencer ........................ 342/125 |
| 4,454,512 | 6/1984 | Millett ........................ 342/125 |
| 4,651,156 | 3/1987 | Martinez ....................... 342/457 |
| 4,656,476 | 4/1987 | Tavtigian ...................... 340/993 |
| 4,703,444 | 10/1987 | Storms, Jr. .................... 364/561 |
| 4,757,315 | 7/1988 | Lichtenberg .................... 342/125 |
| 4,809,006 | 2/1989 | Dar ............................ 342/352 |
| 4,810,179 | 5/1974 | Merrick ........................ 342/46 |
| 4,908,627 | 3/1990 | Santos ......................... 342/125 |
| 5,126,746 | 6/1992 | Gritton ........................ 342/125 |

Primary Examiner—John B. Sotomayor
Attorney, Agent, or Firm—Dennis T. Griggs

[57] ABSTRACT

A range finding system uses non-simultaneous measurements between two communicating and cooperating instruments such that a single carrier frequency is used to exchange information between the instruments with non-simultaneous transmission using the same transmission channel. The range finding system may be considered to be an interrogator/transponder arrangement in which the results of a phase measurement against a local clock is made at one transponder station during one time interval, and then the transponder transmits both a tone derived from the transponder's local clock and the measurement results back to the interrogator station during a second time interval. The interrogator then has everything it needs to accurately compute the range while eliminating local delays in clock differences, while permitting the interrogator and the transponder to share a single frequency intermittently.

4 Claims, 3 Drawing Sheets

STEP 1: TRANSMIT RANGE TONE W1 FROM UNIT A TO UNIT B.

RECEIVE RANGE TONE W1 AT UNIT B, MEASURE AND STORE PHASE RELATIVE TO REFERENCE W2.

STEP 2: RECEIVE RANGE TONE W2 AT UNIT A, MEASURE AND STORE PHASE RELATIVE TO REFERENCE W1.

TRANSMIT RANGE TONE W2 FROM UNIT B TO UNIT A.

STEP 3: RECEIVE PHASE MEASUREMENT FROM UNIT B.

TRANSMIT STORED PHASE MEASUREMENT TO UNIT A.

STEP 4: COMPUTE AND DISPLAY RANGE AT UNIT A.

RANGING BY SEQUENTIAL TONE TRANSMISSION

FIELD OF THE INVENTION

This invention relates generally to electronic range finding systems wherein a signal is sent from one location to another and back, and in particular to a technique for ranging using non-simultaneous transmissions and measurements from two cooperating instruments, one at each end of the distance to be measured, with a single carrier frequency being used to exchange information between the instruments.

BACKGROUND OF THE INVENTION

Ranging by means of phase measurements on range tones transmitted around a closed circuit is a well-known method of determining distance between two points. Since transmission and reception on the same carrier frequency at the same time is not possible due to mutual interference, transmission of the range tones on path AB between stations A and B requires the use of a different RF carrier frequency than is used on the path BA.

Thus, such a distance measuring system requires two simultaneously occupied transmission channels and transmitters and receivers on two different frequencies. Such two frequency systems make inefficient use of the available ratio frequency spectrum.

DESCRIPTION OF THE PRIOR ART

Ranging by measuring the phase of signals sent around a circuit from point A to point B and back is a well established art. For example. U.S. Pat. No. 3,243,812 discloses a system of phase measurement to determine distance. U.S. Pat. No. 4,170,773 also discloses a technique for determining distance by comparing the phase of a transmitted signal with one transponded by a distant device.

This process consists of transmitting a modulated carrier of frequency $f_1$ from point A (the interrogator) to point B (the transponder), coherently recovering the modulation (called range tones) by means of a receiver at point B and impressing this modulation on another carrier of frequency $f_2$. This second modulated carrier is then transmitted from point B to point A where the modulation is recovered. Two versions of the range tones are then simultaneously available at point A, the original tone transmitted to point B, and the tone received from point B. The range or distance from point A to point B is determined by measuring the relative phase of the transmitted tones relative to the received tones and computing the distance from $$D = c\, \phi / 2\, \omega_m - d$$

where
D is the distance from point A to point B,
c is the velocity of light,
$\phi$ is the measured phase,
$\omega_m$ is the angular frequency of the modulation, and
d is the effective distance of the delay through the transmitting and receiving hardware.

Because phase measurements are ambiguous modulo $2\pi$, the corresponding distance will be ambiguous modulo $c\pi/\omega_m$. Measurements can be made on multiple tones of either lower frequencies or at low difference frequencies to allow extension of the ambiguous range to where ambiguity resolution can be accomplished by a priori location information. The range measurement precision $\Delta R$ is a function of the phase measurement precision $\Delta \phi$:

$$\Delta R = c\, \Delta\phi / 2\, \omega_m$$

Such prior art systems require transmission and reception simultaneously on two different frequencies. Phase measurements are made only at the interrogator using a single phase reference source, and the interrogator and receiver hardware perform different functions. The interrogator contains the source of the signal sent around the loop from interrogator to transponder and back, as well as the measurement apparatus for determining the relative phase between the transmitted signal and the received signal. The transponder functions merely to receive the ranging signal and to retransmit it with minimum delay or delay variation.

One limitation on the use of such prior art ranging systems is the requirement for transmission and reception to occur simultaneously at both stations, thus requiring clear channel operation on two different transmit frequencies at the same time. Moreover, the range measuring circuits in such systems are started and stopped by reference marker clock signals which are transmitted from each station. The range calculation is dependent upon the reference clocks being synchronized or locked to each other, and significant range errors will be produced if the clocks are not maintained in close synchronism.

OBJECTS OF THE INVENTION

The principal object of the present invention is to provide a range finding system which uses non-simultaneous measurements between two communicating and cooperating instruments such that a single carrier frequency can be used to exchange information between the instruments with non-simultaneous transmission using the same transmission channel.

Another object of the present invention is to provide a ranging technique using non-simultaneous measurements by two cooperating instruments in which local delays and clock differences are eliminated.

A related object of the present invention is to provide a range finding system which uses non-simultaneous measurements derived from signals transmitted on the same frequency from two separate stations, thus permitting the separate instruments to share a single frequency intermittently, thus conserving bandwidth.

SUMMARY OF THE INVENTION

The foregoing objects are achieved according to the present invention in which two cooperating instruments, one at each end of the distance to be measured, compute range by using non-simultaneous signals and measurements. The measurements may be either time-of-arrival measurements relative to a local clock, or equivalent phase measurements relative to a local reference frequency. The measurements made at one end of the distance to be measured are then transmitted to the other end where they are used in combination with the local measurements to compute the distance. Because of the non-simultaneous nature of these measurements, the same transmission channel can be used for both measurements and the instruments can be the same at each end of the path.

A time or phase signal W1 is transmitted from Unit A to Unit B using a modulated carrier of frequency $F_1$. The modulated carrier is received at Unit B where the time or phase signal is recovered. A sequence of measurements is made by the equipment at Unit B of either the time of arrival of the signal relative to a local clock (at the Unit B location) or the phase of the signal relative to a local phase reference (at Unit B). The results of these measurements are stored in a random access memory (RAM).

After a predetermined time sufficient to allow the sequence of measurements to be made at Unit B, the transmission of Unit A is terminated, thus freeing the communication channel for use by the Unit B equipment. In Step 2, Unit B transmits on the same carrier frequency $F_1$ either a time or phase signal W2 derived from its local time or phase reference. This signal is transmitted during an interval which is sufficient for Unit A to receive the signal, make and store measurements of the received time relative to its local clock (at Unit A), or the received phase relative to its local phase reference. Then in Step 3, Unit B transmits its stored measurements to Unit A using conventional analog or digital modulation techniques on the carrier frequency $F_1$.

At this point, Unit A has in its memory two sets of measurements, those made by Unit B at time $T_1$ relative to Unit B's local time or phase reference, and those made by Unit A at time $T_2$ relative to its own local time or phase reference. In Step 4, Unit A computes and displays the range from Unit A to Unit B.

In other words, the range finding system of the present invention can be considered to be an interrogator/transponder arrangement in which the results of a phase measurement against a local clock is made at the transponder station during one time interval, and then the transponder transmits both a tone derived from the transponder's local clock and the measurement results back to the interrogator station during a second time interval. The interrogator then has everything it needs to accurately compute the range while eliminating local delays in clock differences, while permitting the interrogator and the transponder to share a single frequency intermittently, thus conserving bandwidth.

Operational features and advantages of the present invention will be understood by reading the detailed description which follows with reference to the accompanying drawings, wherein:

DETAILED DESCRIPTION OF THE PREFERRED EMBODIMENT

Figure 1:
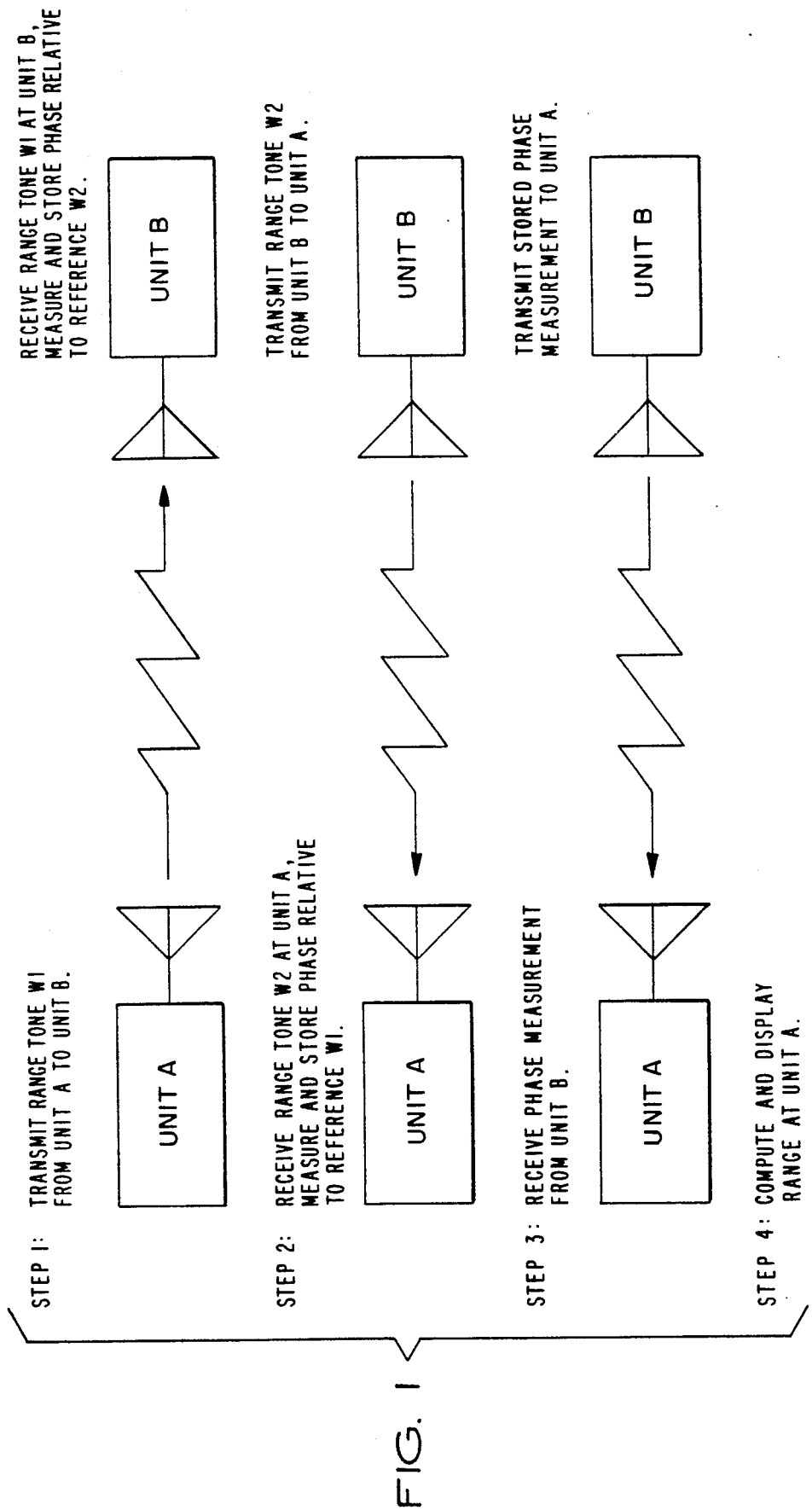
FIG. 1 shows a diagram of the sequence of events where two units communicate non-simultaneously on the same frequency to determine the distance between the units.

Referring to FIG. 1, Step 1, a time or phase signal W is transmitted from Unit A to Unit B using a modulated carrier of frequency $f_1$. This modulated carrier is received at Unit B and the time or phase signal is recovered. A sequence of measurements is made by the equipment at Unit B of either the time of arrival of the signal relative to a local clock, or the phase of the signal relative to a local phase reference. The results of these measurements are stored in a random access memory.

After a predetermined time sufficient to allow the sequence of measurements to be made at Unit B, the transmission from Unit A ceases, thus freeing the communication channel for use by the apparatus at Unit B. In Step 2, Unit B transmits on the same carrier frequency $f_1$ either a time or phase signal W2 derived from its local time or phase reference for a time sufficient for Unit A to receive the signal and make and store measurements of the received time relative to its local clock or phase relative to its local phase reference. Then, in Step 3, Unit B transmits its stored measurements to Unit A using conventional analog or digital modulation techniques on the carrier frequency $f_1$.

At this point in the sequence, Unit A has in its memory two sets of measurements, those made by Unit B at time $t_1$ relative to Unit B's local time or phase reference, and those made by Unit A at time $t_2$ relative to its own local time or phase reference. In Step 4, Unit A computes and displays the range from Unit A to Unit B. As shown below, either type of measurement can be processed to yield the distance between Units A and B.

In the case of time-of-arrival measurements, the apparatus consists of clocks A, B and a means for transmitting time from one unit to the other.

The time read by clock A, $t_a$, at any given time $t$ is given by $$t_a = t_{0a} + v_a t$$

where $t_{0a}$ is the time read by clock A at $t=0$, and $v_a$ is the rate of clock A.

Similarly, the time read by clock B, $t_b$, is given by $$t_b = t_{0a} + v_b t$$

where $t_{0b}$ is the time read by clock at $t=0$, and $v_b$ is the rate of clock B.

If the clocks are synchronized, then $t_{0a} = t_{0b}$, and $v_a = v_b$. Such synchronization is not necessary for the operation of this invention except for limitations on the difference between the rates of $v_a$ and $v_b$.

Now suppose that the time of clock A is broadcast by means of a signal transmitted from Unit A at time $t_0$ to Unit B. At time $t = t_0 + R/c + d_{ab}$, Unit B receives the time signal from Unit A and notes the time read by its local clock. Unit B can then determine the difference between the time received from Unit A, and the time read by the clock in Unit B. This time difference, $t_{ab}$, measured at Unit B is given by $$\begin{aligned} t_{ab} &= t_a - t_b \\ &= t_{0a} + v_a t_0 - t_{0b} - v_b(t_0 + R/c + d_{ab}) \end{aligned}$$

where
R is the distance between A and B,
c is the velocity of signal propagation between A and B, and
$d_{ab}$ is the equipment delay associated with the transmission from A to B.

Unit B now transmits the time of its clock to Unit A at time $t_1$. The time difference, $t_{ba}$, measured at Unit A at a time $t_2$ is given by $$t_{ba} = t_b - t_a$$
$$= t_{0b} + v_b t_1 - t_{0a} - v_a(t_1 + R/c + d_{ba})$$

where $d_{ba}$ is the equipment delay associated with the transmission from B to A.

Unit B now transmits the value of $t_{ab}$ previously measured following calculations. The sum of the time readings $t_{ab}$ and $t_{ba}$, $\Sigma$, is given by $$\Sigma = t_{0a} + v_a t_0 - t_{0b} - v_b t_0 - v_b R/c - v_b d_{ab}$$
$$-t_{0a} - v_a t_0 + t_{0b} + v_b t_0 - v_a R/c - v_a d_{ba} +$$
$$v_b \Delta t - v_a \Delta t$$
$$= -(v_a + v_b)R/c - v_b d_{ab} - v_a d_{ba} + (v_b - v_a)\Delta t$$

where $\Delta t = t_1 - t_0$.

Notice the cancellation of terms involving $t_{0a}$, $t_{0b}$, and $t_0$, indicating that the settings of the two clocks and the exact time of measurement do not affect the measured value of $\Sigma$. This cancellation is fundamental to the present invention. Solving this equation for the distance, R, gives $$R = \{-\Sigma - v_b d_{ab} - v_a d_{ba} + (v_b - v_a)\Delta t\}c/(v_a + v_b)$$

The rate of clock B is given by $$v_b = v_a + \Delta v$$

and upon substitution, $$R = \{-\Sigma - v_a(d_{ab} + d_{ba}) - \Delta v(d_{ba} - \Delta t)\}c/(2v_a + \Delta v)$$

Thus, to determine the distance, it is necessary to form estimates of the quantities $v_a$, $d_{ba}$, $d_{ba}$, $\Delta v$, and $\Delta t$. $v_a$ is known from the properties of the clock at site A. $d_{ab}$ and $d_{ba}$ are determined from self-calibration measurements where each unit transmits its time to itself resulting in measurements of $d_{aa}$ and $d_{bb}$. $d_{ab} + d_{ba}$ will be equal to $d_{aa} + d_{bb}$. $d_{ba}$ can be approximated by half the sum of $d_{aa}$ and $d_{bb}$.

$\Delta v$ is determined by making multiple measurements of either or both $t_{ab}$ and $t_{ba}$. It can be shown that $$\Delta v = -\{t_{ab}(t_0 + \delta t) - t_{ab}(t_0)\}\delta t,$$

and $$\Delta v = \}t_{ba}(t_1 + \delta t) - t_{ba}(t_1)\}/\delta t$$

Fortunately, if $\Delta v$ is a small quantity (the clocks are running at approximately the same rate), the effect of an error in determining $\Delta t$ is reduced by this quantity. $\Delta t$ can be estimated by recording the initial time which is sent from clock A and taking half the difference between the time at clock A when the message is received from Unit B and the initial time.

A similar set of equations can be derived for the case where phase measurements are made. A signal whose phase is given A similar set of equations can be derived for the case where phase measurements are made. A signal whose phase is given by $$\Phi_a = \Phi_{0a} + \omega_a t$$

is sent from Unit A to Unit B. The phase of Unit B's phase reference is given by $$\Phi_b = \Phi_{0b} + \omega_b t$$

where
$\Phi_{0b}$ is the phase at t=0, and
$\omega_b$ is the phase rate of the phase reference at Unit b.

The relative phase of the received signal from Unit A relative to the phase reference at Unit B at time t is given by $$\Phi_{ab}(t) = \Phi_a(t) - \Phi_b(t)$$
$$= \Phi_{0b} + \omega_a(t - R/c - d_{ab}) - \Phi_{0b} - \omega_b t$$

At time $t + \Delta t$, the phase reference from Unit B is transmitted to Unit A and the relative phase $\Phi_{ba}$ measured, where $$\Phi_{ba}(t + \Delta t) = \Phi_b(t + \Delta t) - \Phi_a(t + \Delta t)$$
$$= \Phi_{0b} + \omega_b(t + \Delta t - R/c - d_{ba}) -$$
$$\Phi_{0a} - \omega_a(t + \Delta t)$$

The sum of these two phase measurements is given by $$\Sigma = \Phi_{ab}(t) + \Phi_{ba}(t + \Delta t)$$
$$= \Phi_{0a} + \omega_a t - \Phi_{0b} - \omega_b t - \omega_a R/c - \omega_a d_{ab}$$
$$-\Phi_{0a} - \omega_a t + \Phi_{0b} + \omega_b t - \omega_b R/c - \omega_b d_{ba} +$$
$$(\omega_b - \omega_a)\Delta t$$
$$= -(\omega_a + \omega_b)R/c - \omega_a d_{ab} - \omega_b d_{ba} + (\omega_b - \omega_a)\Delta t$$

Again, note the cancellation of terms involving $\Phi_{0a}$, $\Phi_{0b}$, $\omega t$, and $\omega_b t$. Solving for R, $$R = \{-\Sigma - \omega_b d_{ba} - \omega_a d_{ab} + (\omega_b - \omega_a)\Delta t\}c/(\omega_a + \omega_b)$$

If $\omega_b = \omega_a + \Delta\omega$, then $$R = \{-\Sigma - \omega_a(d_{ab} + d_{ba}) - \Delta\omega(d_{ab} - \Delta t)\}c/(2\omega_a + \Delta\omega)$$

As before the value of $\omega_a$ is known a priori, and the value of $(d_{ab} + d_{ba})$ can be determined from the phase calibration measurements $d_{aa}$ and $d_{bb}$. The difference in the time of measurements at B and the measurements at A, $(\Delta t)$, is determined by the measurement software. The uncertainty in this time difference, $v(\Delta t)$, will be a factor in the precision with which range measurements can be made. Fortunately, because its effect is proportional to $\Delta\omega$, this uncertainty can be much greater than the propagation delay between the two measurement stations without adverse effect on the calculated range.

The frequency difference $\Delta\omega$ between $\omega_a$ and $\omega_b$ can be determined from the sequence of phase measurements at point B from $$\omega_b - \omega_a \Delta\omega = \{\Phi_{ab}(t) - \Phi_{ab}(t + \delta t)\}/\delta t$$

and/or from a sequence of phase measurements made at A from
ti $\Delta\omega = -\{\Phi_{ba}(t) - \Phi_{ba}(t + \delta t)\}/\delta t$ The value of $\Delta t$ will be equal to $\Delta t_0 + R/c$ since the measurement at A is made at a fixed time after receipt of the signal from B. Here, $\Delta t_0$ is a fixed time delay which is determined by the system hardware design.

Figure 2:
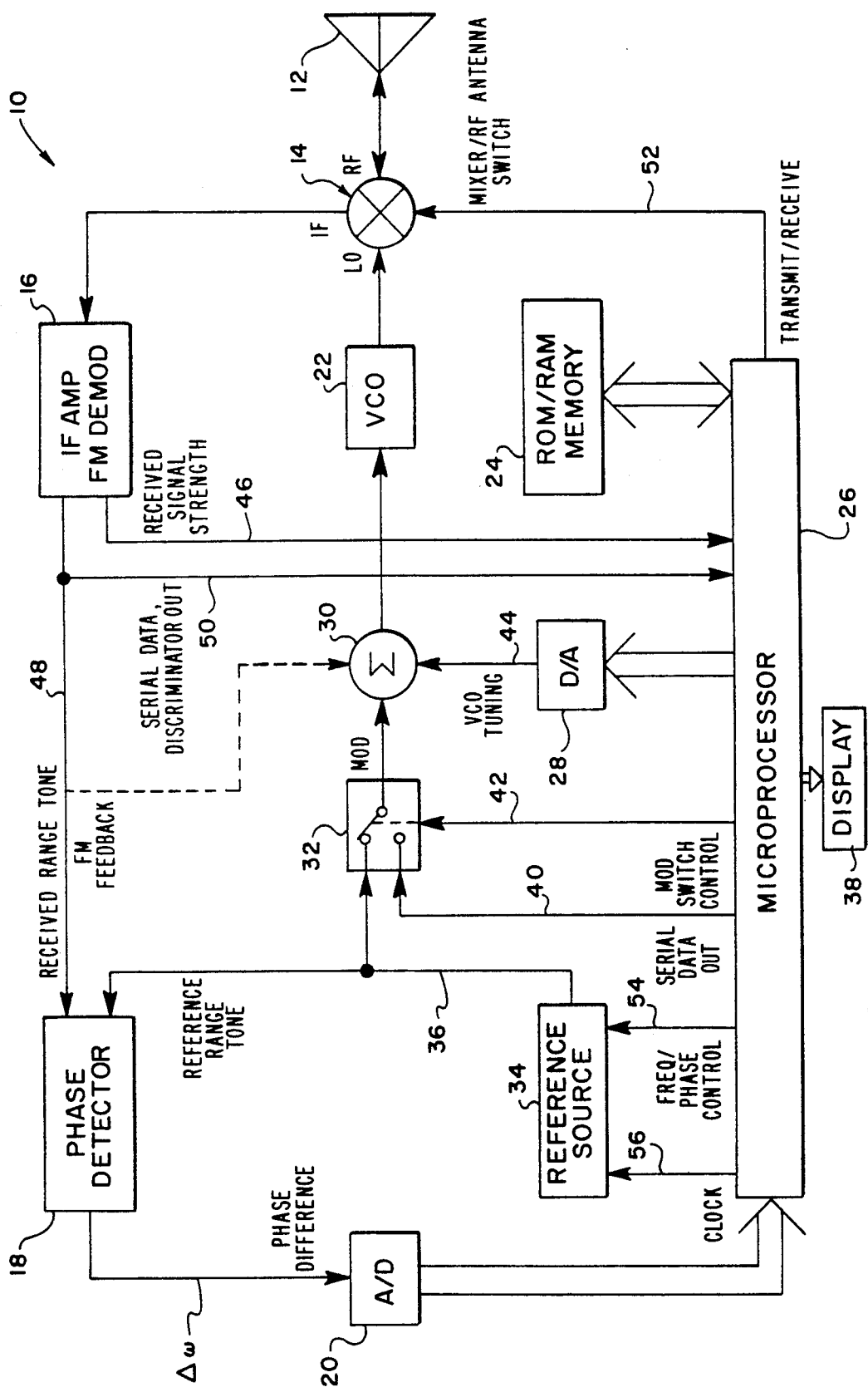
FIG. 2 shows a block diagram of a preferred implementation of the invention; and, FIG. 3 shows a timing diagram of the sequence of events for the preferred embodiment.

Referring now to FIG. 2 a typical transresponder 10 is illustrated. Two transresponders 10 are required, one at each end of the path to be measured. These units 10 (both A and B) are called transresponders (from transmitter/responder) and can both transmit and receive on a given carrier frequency f.

Each transresponder 10 consists of an antenna 12, a mixer/rf switch 14, an intermediate frequency amplifier and demodulator 16, a phase detector 18, an analog-to-digital converter 20, a voltage controlled oscillator (VCO) 22, a digital memory 24 consisting of read only memory (ROM) containing the transresponder's computer code, random access memory (RAM) for the storage of parameters, values and results, a microprocessor 26, a digital-to-analog converter 28, a summer 30, an electronic switch 32 controlled by software instructions from the microprocessor 26, a crystal controlled oscillator 34 to produce a reference tone (frequency) 36, and a digital display 38 such as a liquid crystal display.

The voltage controlled oscillator (VCO) 22 serves as a source for the transmitted signal when in transmit mode, and as the receiver local oscillator when in receive mode.

The functioning of the transresponder 10 is controlled by the general purpose microprocessor 26 under the direction of computer instructions in the ROM/RAM memory 24. In order to transmit, the microprocessor 26 places the switch 32 in the transmit mode and selects either serially encoded data from the serial data signal 40 or a reference tone 36 from the reference oscillator 34. The selected source is applied to the summer 30 and thus to the VCO 22 which produces the final, modulated radio frequency to be transmitted through the antenna 12. The reference tone 36 generated by the reference oscillator 34 is selected by the microprocessor 26 by the Mod Switch Control signal 42 and is synchronized with the internal microprocessor clock. The desired nominal frequency of the VCO 22 is computed by the microprocessor 26 which generates a control voltage signal 44 via the digital-to-analog converter 28 which is mixed with the modulated signal MOD in the summer 30 and applied to the VCO 22.

In the receive mode, the switch 14 is set to receive and the incoming RF signal from the antenna 12 is applied to the RF port of the mixer switch 14. The VCO 22 output signal is applied to the LO port of the mixer switch 14 and the resulting IF signal at the IF port of the mixer switch 14 is connected to the intermediate frequency amplifier and frequency modulation (FM) demodulator 16. The FM demodulator 16 has three outputs: an output signal 46 having a voltage level proportional to the received signal strength that indicates the presence of a signal; the range tone signal 48 received from the cooperating transresponder; and, a discriminated serial data signal 50 when present. The received range tone signal 48 is applied to the phase detector 18 and the serial data signal 50 is applied to the microprocessor 26.

The phase detector 16 is also supplied with a reference range tone signal 36 from the reference oscillator 34. The phase of the received range tone signal 48 and the reference range tone signal 36 are compared in the phase detector 18. The phase difference signal $\Delta\omega$ between the two is connected to the input of the analog-to-digital converter 20. The digital output from the analog-to-digital converter 20 is supplied to the microprocessor 26. The digital display 38, controlled by the microprocessor 26, displays the final computed distance result. It will be appreciated that the computed distance results could just as well be transmitted to a remote location or supplied to another computer.

Figure 3:
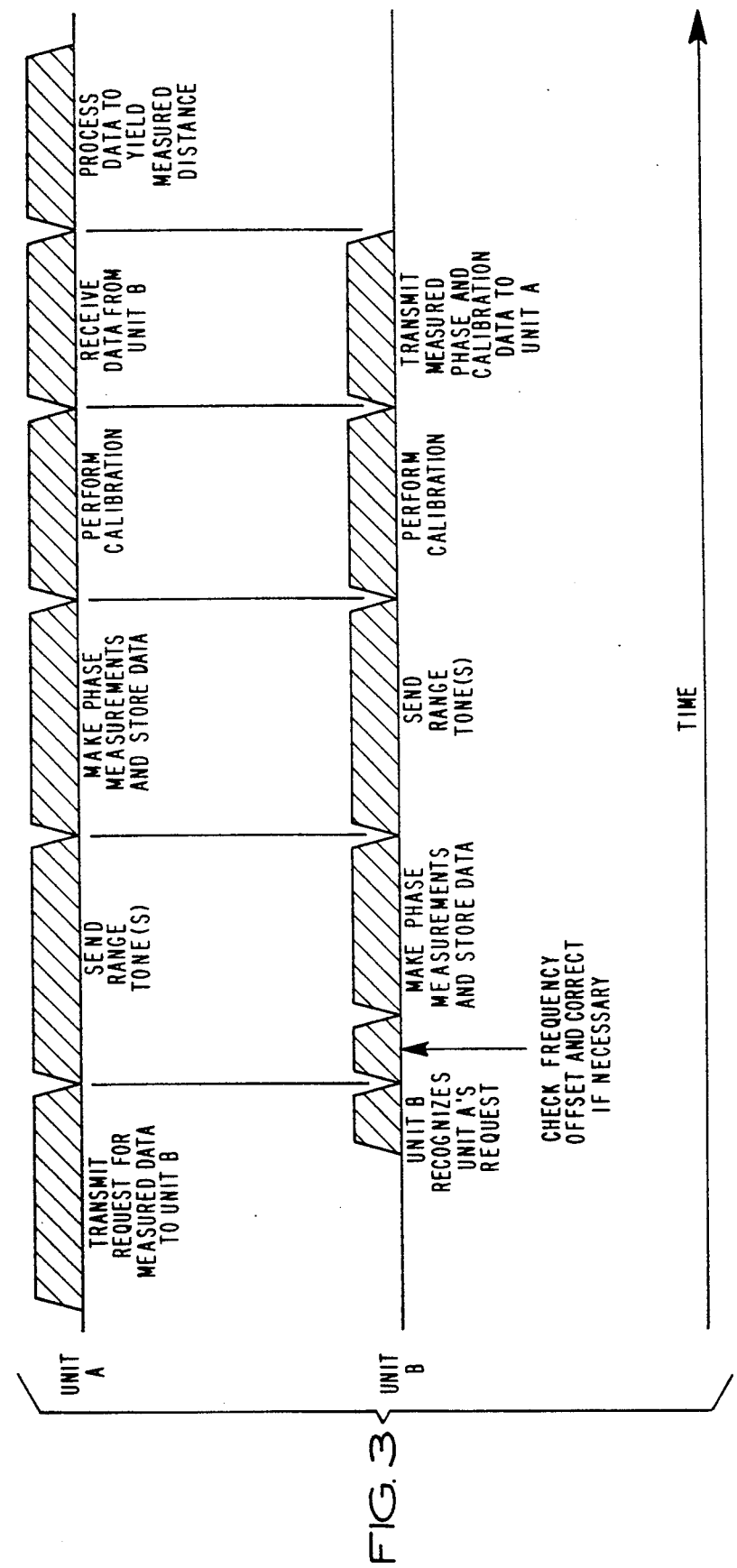

Referring now to FIG. 3, a typical timing diagram is shown for the sequence of events between two transresponders 10 (hereinafter referred to as "Unit A" and "Unit B"), each constructed as shown in FIG. 2. In normal system operation immediately prior to a distance measurement sequence, both transresponders are waiting in the receive mode. To initiate a distance measurement from one transresponder to the other, the interrogating unit (Unit A) sets its VCO 22 frequency to the carrier frequency f using an appropriate input to the D/A converter 28. Next, Unit A's VCO 22 output signal is connected to its antenna 12 by means of a transmit/receive control signal 52 from the microprocessor 26 to the RF switch 14. The mixer 14 itself can be used as such a switch by properly applying the control signal to the mixer IF port (indicated by the transmit/receive line 52 from the microprocessor 26 to the mixer 14), causing the RF and LO ports to be connected together. Alternatively, a dedicated electronic switch may be used.

All transresponders within range of the interrogating unit will detect the presence of the transmitted carrier by comparing the received signal strength output of the IF amplifier and FM demodulator 16 with a preset threshold. If the received signal strength 46 exceeds this threshold, the unit will enter a "receive digital data" mode using conventional digital data transmission techniques such as frequency shift keying (FSK). The received digital data are fed from the FM demodulator 16 to the serial data input port of the microprocessor 26 on the serial data signal line 50.

Each transresponder 10 has a unique identification code assigned which is used by the interrogating transresponder to designate the unit to which a distance measurement is desired.

The interrogating unit (Unit A) first transmits a message packet of serial data containing a request for measured data and the identification code of the unit from which a response is desired as shown in the timing diagram of FIG. 3. Only the unit whose identification code matches that in its received data packet will then enter the "check reference" and "measure phase" modes shown in FIG. 3. After transmitting the digital data packet, the microprocessor 26 of the interrogating unit (Unit A) actuates switch 32 to switch the modulation source from the serial data output 40 of the microprocessor 26 to its local reference oscillator 34 and transmits a sequence of one or more fixed frequency tones for a fixed time interval. The number and frequency of these tones will determine the range measurement accuracy and unambiguous range interval. After sending the range tones, the interrogating unit switches to a "receive digital data" mode and waits for a response from the responding unit (Unit B).

During the time when the interrogator (Unit A) is transmitting its range tone sequence, the responding unit (Unit B) first checks for a match between its reference frequency and that of Unit A by making a series of phase measurements using its phase detector 18 If the measured phase rate (frequency difference) is outside a preset tolerance, then Unit B commands a frequency correction signal 54 to its reference source 34 to reduce the frequency error to within tolerance. At a given time after receipt of the request for data from Unit A, Unit B begins making a series of phase measurements of the received range tone from the FM demodulator 16 relative to its local reference 34. Phase measurements are made using 0, 90, 180, 270 degrees phase references to cancel certain DC biases in the phase detector 18 and to obtain unambiguous phase data. These phase measurements are digitized by the analog-to-digital converter 20 and stored by the microprocessor 26 in Unit B's RAM memory 24 for subsequent transmission to the interrogating unit (Unit A).

After a predetermined time interval from reception of its identification code, the responding unit switches from its "measure phase" mode to "send range tone" mode. The responding unit (Unit B) then sends a sequence of range tones derived from its local reference 34 for a predetermined period of time during which the interrogating unit receives the range tones and makes a sequence of phase measurements relative to its local reference 34 using its phase detector 18 and analog-to-digital converter 20. These measurements are stored in the microprocessor's RAM memory 24 for use in determining the range to the responding unit. After a preset time interval, the interrogating unit (Unit A) switches to a "receive digital data" mode. The responding unit (Unit B) then transmits its stored phase measurements and calibration data (described below) to the interrogating unit.

The microprocessor 26 in the interrogating unit now processes the phase and calibration data in its memory to arrive at the desired distance which is displayed to the user via the digital display 38 or transmitted in digital form to a remote location or to another device.

The calibration data are measured at each unit by tuning the VCO 22 to a frequency such that a harmonic of the microprocessor clock signal 56 is translated to the system IF frequency. The VCO 22 is then frequency modulated with the range tones, and phase measurements are made of the received range tone relative to the modulating range tones. The measured phase difference is due to the delay through the instrument and is used to remove the effect of equipment delay from the range measurements. The calibration signal can also be supplied by a calibration VCO (not shown) at the system IF frequency. This calibration VCO signal is frequency modulated by the reference tone and injected into the IF amplifier at its input.

Some typical values for the parameters of a preferred embodiment are as follows:

$f = 918$ MHz, $f_{IF} = 30$ MHz, $f_a = \omega_a/2\pi = 500$ kHz, $\Delta\omega < 2\pi * 10$ Hz, $\Delta t < 10^{-3}$ sec, $\epsilon(\Delta t) < 10^{-3}$ sec, and $d_{ab} < 10^{-6}$ sec.

Given these values, the maximum unambiguous range of the measurements is $$R_{max} = c/2f_a = 300 \text{ meters}$$

The range of error due to the non-simultaneous nature of the phase measurements is given by $$\epsilon R = \Delta\omega(d_{ab} - \epsilon(\Delta t)) \ c/\ (2\omega_a + \Delta\omega) < 0.03 \text{ meters}$$

The advantages of the present invention are the ability to measure distance between cooperating transresponders using a single carrier frequency for both transmission and reception at both ends, the use of identical hardware at both ends of the distance measured, the absence of problems caused by trying to transmit and receive simultaneously at the same location at the same time (since each unit only transmits or receives at any given time), the use of a sequence of phase measurements to eliminate bias and ambiguity in determining phase and to eliminate ranging errors due to differences in frequency between the local references, and the suppression of ranging errors due to the inherent signal propagation delays within the hardware by appropriate use of self-calibration measurements. The non-simultaneous character of the measurements made allow a single RF source to serve as both transmitter and receiver local oscillator thereby reducing system cost, although two separate oscillators could be used. The self-calibrating nature of this invention means that low cost components such as the VCO 22 can be used.

Although the invention has been described with reference to a specific embodiment, the foregoing description is not intended to be construed in a limiting sense. Various modifications of the disclosed embodiment as well as alternative applications of the invention will be suggested to persons skilled in the art by the foregoing specification and illustrations. For example, the ranging system of the present invention can be used to good advantage in connection with distance measurements in which variations may be induced by voltage fluctuations, temperature changes, aging of components as well as propagation delays induced by conductors of unknown static length. It is therefore contemplated that the appended claims will cover any such modifications or embodiments that fall within the true scope of the invention.

What is claimed is:

1. A method for measuring the distance between two cooperating instruments, Unit A and Unit B, which compute range by using non-simultaneous signals and measurements, comprising the steps:

transmitting from Unit A on a predetermined carrier frequency a first time or phase modulation signal derived from the local time or phase reference of Unit A;

receiving the first modulated carrier signal at Unit B and recovering the time or phase reference signal of Unit A;

performing a sequence of measurements at Unit B on either the time of arrival of the modulated carrier signal relative to a local clock at Unit B or the phase of the modulated carrier signal relative to a local phase reference at Unit B;

storing the results of the Unit B measurements in a random access memory in Unit B;

after a predetermined time sufficient to allow the sequence of measurements to be made at Unit B, terminating the transmission of the modulated carrier signal from Unit A;

transmitting from Unit B on the same predetermined carrier frequency a second time or phase modulation signal derived from the local time or phase reference of Unit B;

receiving the second modulated carrier signal at Unit A and recovering the time or phase reference signal of Unit B;

performing a sequence of measurements at Unit A on either the time of arrival of the second modulated carrier signal relative to a local clock at Unit A or the phase of the second modulated carrier signal relative to a local phase reference at Unit A;

storing the results of the Unit A measurements in a random access memory in Unit A;

after a predetermined time sufficient to allow the sequence of measurements to be made at Unit A, terminating the transmission of the second modulated carrier signal from Unit B;

transmitting the results stored in Unit B to Unit A on the same predetermined carrier frequency; and, computing the range from Unit A to Unit B as a function of the two sets of stored measurements, those made by Unit B relative to Unit B's local time or phase reference and the measurements made by Unit A relative to its own local time or phase reference.

2. A method for measuring the distance between two cooperating instruments, Unit A and Unit B, which compute range by using non-simultaneous signals and measurements, comprising the steps:

transmitting a first range tone from Unit A to Unit B;

receiving the first range tone at Unit B;

measuring and storing the phase of the first range tone relative to a second range tone W2;

transmitting the second range tone from Unit B to Unit A;

receiving the second range tone at Unit A;

measuring and storing the phase of the second range tone relative to the first range tone;

transmitting the stored phase measurements in Unit B to Unit A;

receiving in Unit A the stored phase measurements from Unit B;

storing the phase measurements received from Unit B in Unit A; and, computing the range from Unit A to Unit B as a function of the two sets of stored phase measurements.

3. A method for measuring the distance between an interrogator and a transponder comprising the steps:

transmitting from the interrogator on a predetermined carrier frequency a first time or phase modulation signal derived from the local time or phase reference of the interrogator;

receiving the first modulated carrier signal at the transponder and recovering the time or phase reference signal of the interrogator;

comparing the results of the time or phase reference measurement against a local clock at the transponder station during one time interval;

transmitting a tone derived from the transponder's local clock or phase reference and the measurement results back to the interrogator station during a second time interval; and, computing the range from the interrogator to the transponder by processing the two sets of measurements, those made by the transponder relative to the transponder's local time or phase reference, and those made by the interrogator relative to its own local time or phase reference.

4. A method for measuring the distance between two cooperating instruments, Unit A and Unit B, which compute range by using non-simultaneous signals and measurements, comprising the steps:

transmitting from Unit A a message packet of serial data containing a request for measured data and the identification code of the transponder unit from which a response is desired;

after transmitting the digital data packet, transmitting from the interrogating unit a sequence of one or more fixed frequency tones during a fixed time interval;

comparing the reference frequency of the responding unit with the received range tone signal;

commanding a frequency correction to the reference source to reduce the received frequency error within a predetermined tolerance value;

performing a series of phase measurements on the received range tone relative to the transponder's local reference;

after a predetermined time interval from reception of the identification code, switching the responding unit from measure phase mode to send range tone mode;

sending a sequence of range tones from the responding unit for a predetermined period of time during which the interrogating unit receives the range tones and makes a sequence of phase measurements relative to its local reference;

storing the measurements in a random access memory in the interrogating unit;

transmitting the stored phase measurements and calibration data from the responding unit to the interrogating unit; and, processing the phase and calibration data in the memory of the interrogating unit to yield the distance from Unit A to Unit B.

* * * * *